United States Patent
Baumgaertel et al.

(10) Patent No.: US 11,552,819 B2
(45) Date of Patent: Jan. 10, 2023

(54) METHOD FOR ADDRESSING AT LEAST ONE BUS SUBSCRIBER AND BUS SUBSCRIBER AS WELL AS SYSTEM AND MOTOR VEHICLE EQUIPPED THEREWITH

(71) Applicant: HELLA GmbH & Co. KGaA, Lippstadt (DE)

(72) Inventors: Hauke Baumgaertel, Ganderkesee (DE); Paul Deron, Hamburg (DE); Carsten Horst, Worpswede (DE); Karl Kreft, Achim (DE); Daniel Peretzki, Bremen (DE); Daniel Zoellner, Stuhr (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 19 days.

(21) Appl. No.: 17/188,935

(22) Filed: Mar. 1, 2021

(65) Prior Publication Data

US 2021/0273825 A1    Sep. 2, 2021

(30) Foreign Application Priority Data

Feb. 27, 2020 (DE) .................... 10 2020 105 221.9

(51) Int. Cl.
*H04L 12/40* (2006.01)
*H02J 1/10* (2006.01)

(52) U.S. Cl.
CPC ........ *H04L 12/40091* (2013.01); *H02J 1/122* (2020.01); *H04L 2012/40215* (2013.01); *H04L 2012/40273* (2013.01)

(58) Field of Classification Search
CPC ............. H04L 12/40091; H04L 12/403; H04L 2012/40215; H04L 2012/40273; H04L 2012/4135; H04L 2012/4637
See application file for complete search history.

(56) References Cited

U.S. PATENT DOCUMENTS

| 3,964,023 A | 6/1976 | Fauchez |
| 4,608,562 A | 8/1986 | Minor et al. |

(Continued)

FOREIGN PATENT DOCUMENTS

| DE | 19851739 A1 | 5/2000 |
| DE | 10047791 A1 | 3/2002 |

(Continued)

OTHER PUBLICATIONS

Search Report issued DE application No. 10 2020 105 221.9 dated Feb. 27, 2020 (8 pages).

*Primary Examiner* — Rasheed Gidado
(74) *Attorney, Agent, or Firm* — Muncy, Geissler, Olds & Lowe, P.C.

(57) ABSTRACT

The invention relates to a method for addressing at least one bus subscriber, in particular a control device or sensor, which is connected to a bus system for the purpose of exchanging data, and which is supplied with DC voltage in order to supply the bus subscriber with supply voltage rectified as defined via a DC voltage input of said bus subscriber. It is proved according to the invention that the respective bus subscriber detects the polarity of the DC voltage at its DC voltage input, selects a predefined address depending on the detected polarity, and assigns the selected address to itself for the purpose of exchanging the data. The invention further relates to the bus subscriber and a system consisting of a bus system and exactly two bus subscribers of such kind. The invention also relates to a motor vehicle.

12 Claims, 1 Drawing Sheet

(56) References Cited

U.S. PATENT DOCUMENTS

Figure 1:
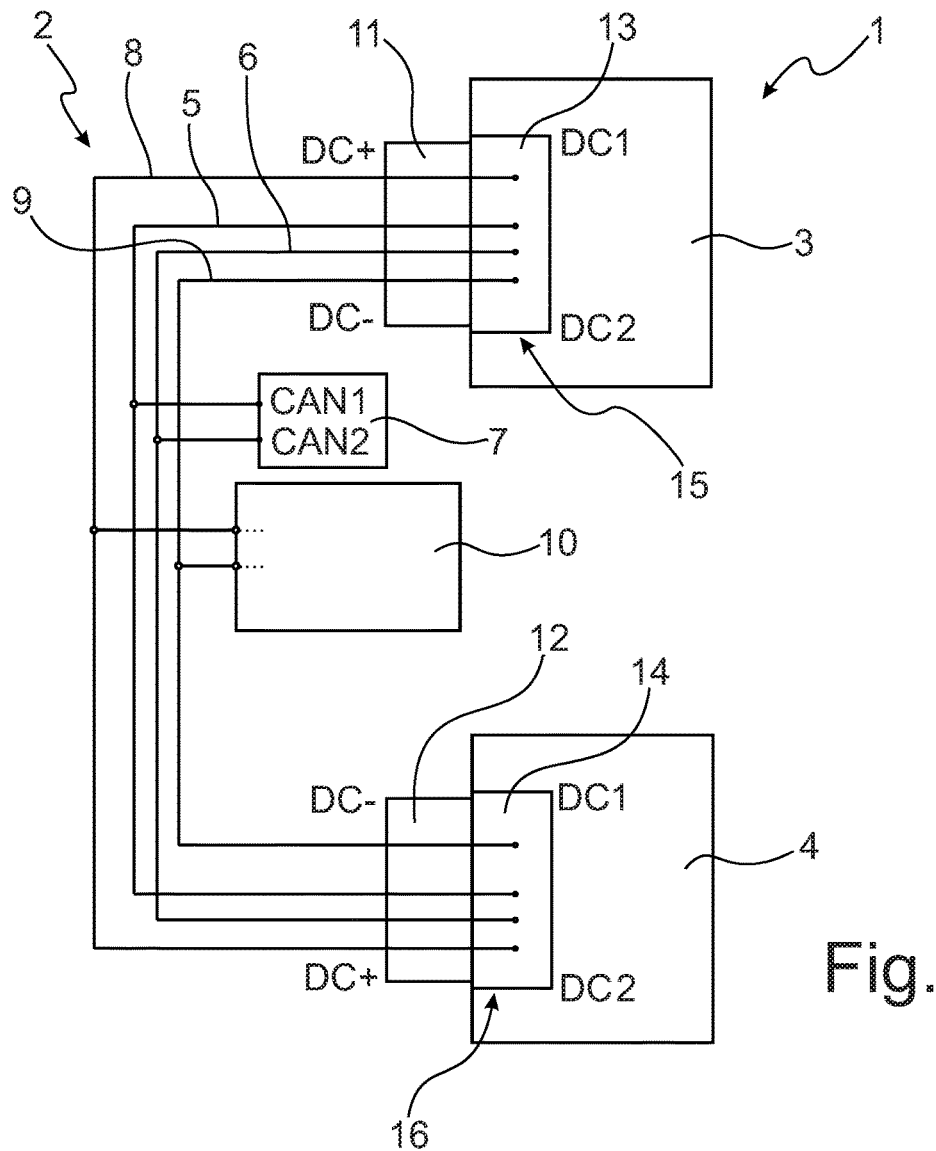

| | | | | |
|---|---|---|---|---|
| 4,785,465 | A * | 11/1988 | Lang | H04L 25/02 |
| | | | | 375/222 |
| 10,666,456 | B2 * | 5/2020 | Scharf | H04L 12/40045 |
| 2004/0263321 | A1 * | 12/2004 | Hair, III | H04B 3/548 |
| | | | | 340/870.07 |
| 2014/0095749 | A1 * | 4/2014 | Lambrechts | H04L 12/403 |
| | | | | 710/104 |
| 2016/0285653 | A1 * | 9/2016 | Walker | H04L 12/40 |
| 2021/0006431 | A1 * | 1/2021 | Pannwitz | H04L 12/40032 |

FOREIGN PATENT DOCUMENTS

| | | | | |
|---|---|---|---|---|
| DE | 10261174 | B3 | 6/2004 | |
| DE | 102013002843 | A1 | 8/2014 | |
| EP | 0415760 | A2 | 3/1991 | |
| EP | 1148399 | A1 * | 10/2001 | B60N 2/0244 |
| EP | 1089147 | B1 | 3/2008 | |

* cited by examiner

METHOD FOR ADDRESSING AT LEAST ONE BUS SUBSCRIBER AND BUS SUBSCRIBER AS WELL AS SYSTEM AND MOTOR VEHICLE EQUIPPED THEREWITH

The invention relates to a method for addressing at least one bus subscriber, in particular a control device or sensor according to the preamble of Patent claim 1. The invention further relates to a bus subscriber of such kind according to the preamble of Patent claim 7 and a system according to Patent claim 11, which consists of a bus system and exactly two bus subscribers of such kind, and finally a motor vehicle according to Patent claim 14.

The bus subscriber is connected to the bus system for the purpose of exchanging data. In order to provide the bus subscriber with a supply voltage rectified as defined, the bus subscriber is supplied with DC voltage via a DC voltage input for this bus subscriber. In first systems, known from DE 102 61 174 B4 and EP 1 089 147 B1, sequential galvanic separation of the bus subscribers connected to a common bus system takes place, so that each of said bus subscribers can be addressed individually with a unique address. As an alternative to this, it is known from DE 198 51 739 A1 to equip each bus subscriber individually with a coding means in the form of a coded pin at its connector. Then, addressing is performed by evaluating the respective coded pin. In both known systems, the bus subscribers, such as control devices or sensors, may each be of identical design. In addition, the same software may also be used for the control devices or sensors.

It is further known to provide a protection against polarity reversal in control devices. For example, DE 100 47 791 A1 includes a description of how a polarity reversal is detected and a short circuit is prevented. DE 10 2013 002 843 A1 discloses a polarity reversal indicator for control devices which is able to indicate a, polarity reversal.

The problem underlying the invention on the basis of the related art described for example in DE 100 47 791 A1 is that of providing a method for addressing at least one bus subscriber, in particular a control device or sensor, the bus subscriber and a system comprising a bus system and the bus subscriber, as well as a motor vehicle equipped therewith inexpensively and to occupy only a small amount of space.

The invention solves this problem with a method according to Patent claim 1, with a bus subscriber according to Patent claim 7, with a system according to Patent claim 11 and with a motor vehicle according to Patent claim 14. Advantageous variants of the invention are described in the subordinate claims.

In a method for addressing at least one bus subscriber, in particular a control device or sensor, which is connected to a bus system for the purpose of exchanging data and which is supplied with DC voltage via a DC voltage input of a bus subscriber to provide said bus subscriber with a supply voltage rectified as defined, it is provided according to the invention that the respective bus subscriber detects the polarity of the DC voltage at its DC voltage input, selects a predefined address depending on the polarity detected, and assigns the selected address to itself for the purpose of exchanging the data.

In the case of a bus subscriber, in particular a control device or sensor, for connection to a bus system, wherein the bus subscriber can be addressed and supplied with DC voltage, it is provided according to the invention that the bus subscriber is designed to detect the polarity of the DC voltage, in particular by the method according to the invention, and to assign an address to the bus subscriber depending on the polarity detected.

The invention has recognised that the polarity of the DC voltage at the DC voltage input can be used to address a bus subscriber selectively. In particular, it is thus possible to selectively address exactly two bus subscribers connected to a bus system. In this context, the bus subscribers are in particular designed with identical construction. Conventional bus systems can typically be operated with more than two bus subscribers. However, this is often not necessary in the automotive sector, since often only exactly two control devices or sensors are connected jointly to a bus system, one bus subscriber being assigned to the left side of the vehicle and one bus subscriber being assigned to the right side of the vehicle.

Because the polarity of the DC voltage is used for addressing, an address circuit in the bus system can be dispensed with. It is also not necessary to set a coded pin on the bus subscriber. Consequently, the bus subscribers may be of identical design, and may only be differentiated from one another by the polarity of the supplied DC voltage, which is produced by their connection to a power supply, in particular by the connection to the bus system. Thus, the invention provides an inexpensive alternative to the use of known bus systems, in particular in the automotive sector.

A rectifier, in particular a bridge rectifier, is advantageously integrated in the bus subscriber. The rectifier rectifies the DC voltage present at the DC voltage input so that the bus subscriber can be supplied with the supply voltage rectified as defined. Therefore, two bus subscribers with different polarity which are supplied with DC voltage at the DC voltage input do not have to be wired differently internally, instead they are preferably of identical design and ready for use regardless of the polarity at the DC voltage input. Bridge rectifiers are generally used to rectify an AC voltage. The invention has recognised that by integrating a bridge rectifier in the bus subscriber it becomes possible to operate the bus subscriber regardless of polarity at the DC voltage input.

The DC voltage input makes a potential available on each of two paths, wherein the two potentials are different from each other. The bus subscriber preferably includes a computing unit. The computing unit determines the potential on at least one path of the DC voltage input, in particular on exactly one path or on both paths of the DC voltage input. In this way, the computing unit establishes the polarity of the DC voltage at the DC voltage input.

The system according to the invention preferably consists of a bus system and exactly two bus subscribers, which are embodied as described according to the invention. In this context, the bus subscribers are connected to the same DC voltage source, in particular the on-board electrical system of a vehicle, in such a way that these bus subscribers can be supplied with DC voltage with opposite polarity to each other at their DC voltage inputs from this DC voltage source. This makes it possible to address exactly two bus subscribers selectively and to supply voltage to them. Consequently, besides a possible two energised voltage conductors, the bus system preferably only has at least one conductor for transmitting signals, in particular exactly one conductor for COM signals or two conductors for COM1 signals and COM2 signals or CAN1 signals and CAN2 signals. In particular, the CAN1 signal and the CAN2 signal are CANhigh signals and CANlow signals.

According to a preferred variant of the invention, the DC voltage input of the respective bus subscriber is supplied with the DC voltage via the bus system. The bus system thus has two conductors or paths with different polarities. Therefore, the bus subscribers only need to be connected to the bus system by one connector each. As a result, a further connection for a voltage supply can be dispensed with.

According to a particularly preferred variant of the invention, the bus system includes one connecting element, in particular one plug connector, for each bus subscriber. The DC voltage input of the respective bus subscriber is supplied with DC voltage via the connecting element. It is also preferably provided that internal contacts of the connecting elements are assigned differently, that is to say with different polarities, in particular with mutually opposite polarities. An address is thus already assigned to a bus subscriber by means of the wiring of the connector to the bus system. Accordingly, the bus subscriber only needs to be connected to the bus system via the plug-in connector and immediately detects its own address automatically. The bus subscribers are preferably designed identically.

A motor vehicle according to the invention is equipped with a system which includes a bus system and at least one bus subscriber connected to the bus system, in particular a control device or a sensor. In such a context, the motor vehicle is equipped with means for carrying out the method according to the invention. Alternatively or additionally, the system's bus subscriber is of the same design as the bus subscriber according to the invention. Alternatively or additionally, the system in the motor vehicle is designed as described according to the invention.

Figure 2:
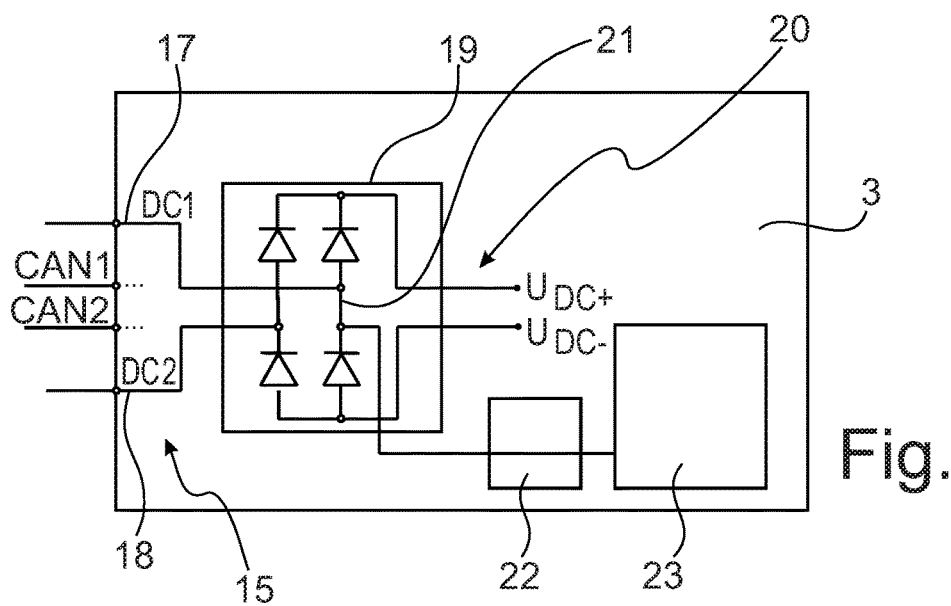

Further variants are discernible from the claims, the drawing, and from the following description of a particularly preferred embodiment of the invention as represented in the drawing. In the drawing:

FIG. 1: shows a simplified, schematic representation of a system consisting of a bus system and two bus subscribers according to and exemplary embodiment of the invention; and FIG. 2: shows a simplified, schematic representation of the bus subscriber according to the invention as represented by the exemplary embodiment of FIG. 1.

FIG. 1 shows a system 1 for fitting in a motor vehicle, wherein the system 1 consists of a bus system 2, a first bus subscriber 3 and a second bus subscriber 4. The bus subscribers 3 and 4 are control devices or sensors which are provided for example for different sides of the motor vehicle.

The bus system 2 has a first data conductor 5 and a second data conductor 6 for communication for example between a central control unit 7 and the bus subscribers 3 and 4. The bus system 2 also has a first energised voltage conductor 8 and a second energised voltage conductor 9 for supplying the bus subscribers 3 and 4 with a DC voltage. The DC voltage is fed into the bus system 2 in particular from a DC voltage source, in particular such as a car battery, via an on-board electrical system 10.

The bus system 2 is connected to the first bus subscriber 3 via a first connecting element 11 embodied as a plug-in connector and to the second bus subscriber 4 via a second connecting element 12, which is also embodied as a plug-in connector. The first connecting element 11 is plugged into a first socket 13 of the first bus subscriber 3. The second connecting element 12 is plugged into a second socket 14 of the second bus subscriber 4. Thus, the connecting elements 11 and 12 and the sockets 13 and 14 enable not only an exchange of data but also the supply of voltage to bus subscribers 3 and 4. The first socket 13 simultaneously fulfills the function of a first DC voltage input 15 for the first bus subscriber 3. The second socket 14 forms a second DC voltage input 16 for the second bus subscriber 4.

The bus subscribers 3 and 4 are constructed identically. The connecting elements 11 and 12 are contacted with the data conductors 5 and 6 identically, but are contacted with the energised voltage conductors 8 and 9 oppositely to each other. Consequently, the DC voltage is incident with opposite polarities at the DC voltage inputs 15 and 16 of the bus subscribers 3 and 4.

FIG. 2 shows the first bus subscriber 3 of the embodiment of FIG. 1 in greater detail. Identical parts are denoted by the same reference numerals in the figures.

The DC voltage input 15 has a first DC voltage connector 17 and a second DC voltage connector 18. A rectifier 19 in the form of a bridge rectifier is electrically connected to the DC voltage connectors 17 and 18. The rectifier 19 ensures that a supply voltage rectified as defined is permanently available at a supply voltage output 20 of the rectifier 19 for operating the first bus subscriber 3 regardless of the polarity at the DC voltage connectors 17 and 18. In this situation, the potentials $U_{DC+}$ and $U_{DC-}$ provided at the supply voltage output 20 are lower than the potentials DC1 and DC2 which are incident at the DC voltage connectors 17 and 18 because diodes of the rectifier 19 cause a voltage drop.

From a path 21 in the rectifier 19, the voltage present there is tapped and fed to a voltage divider 22. The voltage divider 22 lowers the voltage in such manner that the reduced voltage can be delivered to an input of the computing unit 23. By evaluating this voltage, the computing unit 23 detects the polarity at the first DC voltage input 15 and ensures that a predefined address is assigned to the first bus subscriber 3 depending on the established polarity. This addressing makes it possible to detect which data transported in the bus system 2 are intended for the first bus subscriber 3 or which data are fed from the first bus subscriber 3 into the bus system 2.

In contrast to the embodiment represented, the bus system 2 is equipped for example with a different number of data conductors 5, 6, thus for example only with the first data conductor 5. In this case, the data conductor 5 is in particular the data conductor of a LIN bus. On the other hand, the at least two data conductors 5, 6 are for example data conductors of a COM bus or a CAN bus.

All of the features described in the preceding description and in the claims can be combined in any permutation with the features of the independent claim. Thus, the disclosure of the invention is not limited to the feature combinations which are described and/or claimed, but rather all feature combinations that are practicable within the scope of the invention are to be deemed disclosed.

The invention claimed is:

1. A method for addressing at least one bus subscriber, in particular a control device or sensor, which is connected to a bus system for the purpose of exchanging data, and which is supplied with DC voltage in order to supply the bus subscriber with supply voltage rectified as defined via a DC voltage input of said bus subscriber,
   wherein each bus subscriber detects the polarity of the DC voltage at its DC voltage input, selects a predefined address depending on the detected polarity, and assigns the selected address to itself for the purpose of exchanging the data, and
   wherein exactly two bus subscribers are supplied with voltage having opposite polarities at their DC voltage inputs from the same DC voltage source via the bus system, and that the DC voltage input of each bus subscriber is supplied individually with the DC voltage via its own connecting element, in particular a plug-in connector of the bus system, wherein the polarity of the DC voltage at the DC voltage input is determined by the internal assignment of contacts of the connecting element.

2. The method according to claim 1, wherein a rectifier integrated in the bus subscriber, in particular a bridge rectifier, rectifies the DC voltage present at the DC voltage input for supplying the bus subscriber with the supply voltage rectified as defined.

3. The method according to claim 1, wherein a computing unit of the bus subscriber detects the polarity of the DC voltage at the C voltage input, in particular by determining the potential in at least one path of the DC voltage input.

4. The method according to claim 1, wherein the bus subscriber taps the DC voltage present at the DC voltage input lowers the tapped voltage, in particular by a voltage divider of the bus subscriber, and detects the polarity for the tapped and reduced voltage to establish the polarity of the DC voltage at the DC voltage input.

5. The method according to claim 1, wherein the DC voltage input is supplied with the DC voltage via the bus system.

6. A motor vehicle equipped with a system which includes the bus system and the at least one bus subscriber connected to the bus system, in particular a control device or sensor, wherein the motor vehicle has means for performing the method according to claim 1.

7. A system consisting of a bus system and exactly two bus subscribers, which are connected to the same DC voltage source in such manner that said bus subscribers can be supplied with the DC voltage with mutually opposite polarities at their DC voltage inputs from this DC voltage source, each bus subscriber being for connection to the bus system, wherein the each bus subscriber can be addressed and supplied with DC voltage, wherein the each bus subscriber is designed to detect the polarity of the DC voltage and to assign an address to the each bus subscriber depending on the detected polarity, in particular with the aid of a method according to claim 1, and wherein the bus system has one connecting element, in particular one plug-in connector for the each bus subscriber, via which element the DC voltage input of the each bus subscriber can receive DC voltage, and that internal contacts of the connecting elements are assigned differently from each other to ensure supply of the bus subscribers with mutually differing, in particular opposite polarities.

8. The system according to claim 7, wherein a rectifier, in particular a bridge rectifier, is integrated in the bus subscriber to rectify the DC voltage present at the DC voltage input in order to supply the bus subscribers with the supply voltage rectified as defined.

9. The system according to claim 7, wherein the bus subscribers are equipped with a computing unit for determining the polarity of the DC voltage at the DC voltage input, in particular by determining the potentials in at least one path of the DC voltage input.

10. The system according to claim 7, wherein the bus subscribers are designed to tap the DC voltage incident at the DC voltage input, to lower the tapped voltage, in particular with the aid of a voltage divider of the bus subscribers, and to detect the polarity of the DC voltage at the DC voltage input by detecting the polarity of the tapped and reduced voltage.

11. The system according to claim 7, wherein the DC voltage input can be supplied with the DC voltage via the bus system.

12. A motor vehicle equipped with a system which includes the bus system and the two bus subscribers connected to the bus system, in particular a control device or sensor, wherein the system is designed according to claim 7.

* * * * *